April 3, 1956
C. W. OSNER
2,740,154
FREIGHT CAR SIDE DOOR TRAVELER
Filed Dec. 6, 1951
2 Sheets-Sheet 1
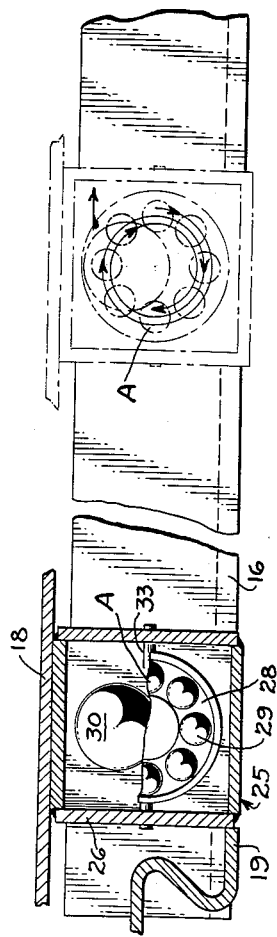
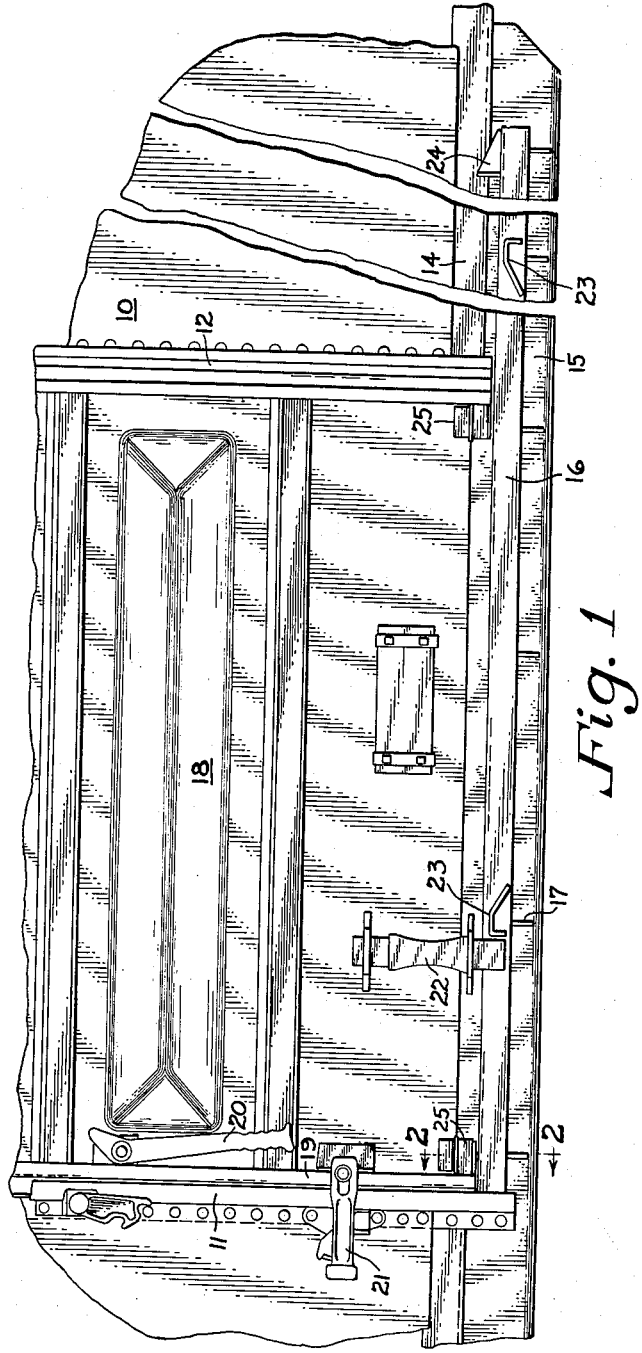
Inventor
Clarence W. Osner
By Wayne Morris Russell
Attorney

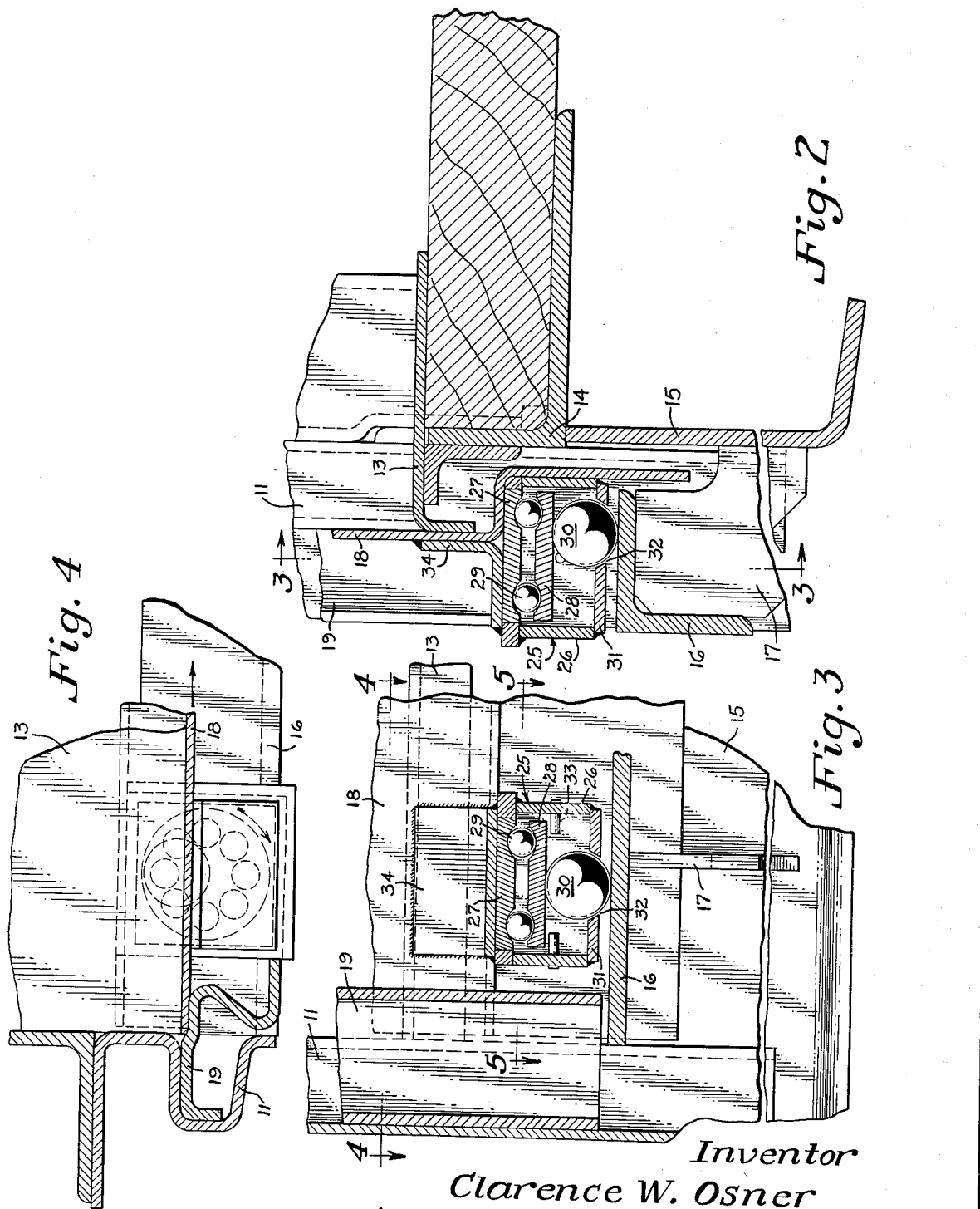

United States Patent Office 2,740,154
Patented Apr. 3, 1956

2,740,154

FREIGHT CAR SIDE DOOR TRAVELER

Clarence W. Osner, Chicago, Ill., assignor to Pullman-Standard Car Manufacturing Company, Chicago, Ill., a corporation of Delaware Application December 6, 1951, Serial No. 260,143

2 Claims. (Cl. 16—88)

The present invention relates to a supporting fixture for the sliding side doors of railway freight cars or like articles, and more particularly to an anti-friction supporting roller assembly which eliminates sliding friction in the operation of such doors or like articles.

In the illustrated embodiment of the invention, the roller fixture or assembly is shown as applied to the lower edge of a bottom-hung freight car side door to provide for smooth, free, and easy operation thereof. The assembly comprises a housing with an opening in the bottom and a ball bearing in the upper portion thereof, including a pair of upper and lower race plates between which anti-friction balls are rollably disposed, the lower race plate being rotatable. The roller is in the form of a ball which engages the bottom face of the lower race plate at a point eccentric of the axis of rotation thereof in a plane transverse of the door, and which projects through the bottom opening of the housing to engage on the track along which the door is slidable to open and closed positions. The opening is so located that upon longitudinal movement of the door the ball rolls in a plane normal to the transverse plane and passing through the point of engagement of the ball and plate. Such rolling of the ball causes rotation of the plate, so that substantially only rolling friction is generated by sliding of the door and sliding friction is so minimized as to be negligible. The door may thus be moved longitudinally very easily and smoothly, for the roller assembly cannot bind or jam and the skidding of the ball is avoided. The opening in the bottom of the housing is of such size and shape as to permit some rolling of the ball against the plate in the transverse plane passing through the point of engagement thereof and the rotational axis of the plate, or in other words radially of that axis, so as to allow for slight lateral movements of the door, as in wedging thereof into close contact with the car side as it moves to closed position or is released for opening movement.

Rollers for sliding doors of freight cars have heretofore been provided in the form of wheels or of balls carrying the door directly on the track, and while such rollers substitute rolling friction for sliding friction to some extent, sliding friction occurs between the wheel hubs and axles, or between the balls and the door and track due to the weight of the door or roughness or irregularity of the ball contacting surfaces. The use of anti-friction bearings for wheel rollers is prohibited by the expense and complications of assembly. The provision of a roller in the form of a ball revolving in directly contacted bearing balls has also been suggested, but here again sliding friction takes place because the bearing balls jam between the roller ball and enclosing surfaces. In other words, the rollers heretofore used have served as both thrust and anti-friction elements or bearings, with resulting inefficiency and failure to eliminate sliding friction. The present invention overcomes this defect by providing a simple, inexpensive, easily applied, and positively operating construction.

It is an object of the invention to provide an anti-friction roller assembly adapted for supporting a sliding freight car door or the like which provides for free, smooth, and easy movement throughout the entire opening and closing of the door.

Another object is the provision of an anti-friction roller assembly for sliding freight car doors or the like which minimizes sliding friction in opening and closing thereof.

Another object is the provision of an anti-friction roller assembly for a sliding door or like article in which the roller bears on a rotatable plate of a thrust bearing in such relation as to rotate the plate when rolling under load and thus greatly minimize sliding friction in the assembly.

Another object is the provision of an anti-friction roller assembly for a sliding door or like article in which a roller bears on a rotatable bearing plate eccentrically of the rotational axis thereof so that when rolling under load in a plane normal to the radial plane through the axis of the bearing point it rotates the plate and sliding friction is greatly minimized, and has limited rolling movement on the plate in the radial plane to allow for slight movement laterally of the normal plane.

Another object is the provision of a roller assembly for a sliding door or like article, having an anti-friction bearing including a plate rotatable about the bearing axis on anti-friction elements and engaged eccentrically of the axis by a ball so as to be rotated by the ball when it rolls under load in a plane normal to the radial plane through the axis of the point of engagment, and having means to permit limited rolling of the ball on the plate in the radial plane, so that sliding friction is reduced to negligible proportions in rolling of the ball in the normal plane and also in limited rolling in the radial plane.

Other and further objects, advantages, and features of the invention will be apparent to those skilled in the art from the following description and the accompanying drawings, in which:

Fig. 1 is a fragmentary side elevation of a railway freight car and silding side door therefor having the roller assembly applied thereto;

Fig. 2 is an enlarged vertical sectional view taken substantially as indicated by the line 2—2 of Fig. 1;

Fig. 3 is a vertical sectional view taken substantially as indicated by the line 3—3 of Fig. 2;

Fig. 4 is a horizontal sectional view taken substantially as indicated by the line 4—4 of Fig. 3; and Fig. 5 is a broken horizontal sectional view with parts broken away, taken substantially as indicated by the line 5—5 of Fig. 3, showing in broken lines a second position of the roller assembly.

Referring to the drawings, there is shown a portion of a box car 10 having a door opening in a side wall thereof with a front door stop at the forward edge thereof which includes a spark strip 11, a rear spark strip 12, and a threshold plate 13 extending outwardly of the car side. The side of the car includes the usual side sill 14 having a sub-sill or reinforcement 15 below it, on which a track 16 formed by an angle member is supported in outwardly spaced relation by suitable brackets 17. A bottom-hung door 18 is arranged to move longitudinally along the track to open and close the door opening, the bottom of the door being offset inwardly to provide a portion underlying the threshold and a depending flange between the track 16 and the side sill 14 and reinforcement 15. At the front edge of the door is a reinforcement 19 adapted to engage in the channel of the spark strip 11, and a comparable arrangement, not shown, is provided for sealing the rear edge of the door in closed position. The door 18 may have a starter and closer 20, locking and sealing means 21, and a combined safety latch and handle 22 engageable with front and rear keepers 23 secured on the depending flange of the track 16. A rear door stop 24 is secured on the track at the rear thereof in position to engage the rear edge of the fully opened door.

A pair of substantially identical roller fixtures or assemblies 25 are applied to the bottom of the door at the front and rear edges thereof to support the door for longitudinal rolling movements on the track 16. As best shown in Figs. 2, 3, and 4, each roller assembly comprises a housing 26, in this case formed of suitable plates welded together into rectangular box-like shape, but which may be pressed, cast, or otherwise formed in any appropriate shape. In the housing is disposed a suitable rotating bearing to take the rolling movements of the ball roller and supporting the door for longitudinal movement and in the present instance comprises a ball bearing consisting of upper and lower race plates 27 and 28 with cooperating annular races for anti-friction balls 29 disposed therebetween. The upper plate 27 fits snugly into the top of the housing and forms a major portion of the top wall thereof, as shown, although other constructions may be employed if desired. The lower race plate 28 is free to rotate on the balls 29 about the axis of the ball races, so that it may be rotated by a roller contacting its under surface. The roller preferably is a ball 30 which engages the plate 28 at a point eccentric of its axis of rotation and in a plane extending transversely of the door 18 and track 16, or in other words at right angles to the plane of travel of the door. The bottom wall 31 of the housing 26 is provided with an aperture 32 through which the portion of the roller ball 30 diametrically opposite the point of engagement with the plate 28 projects to engage on the track 16. The bottom wall serves as a retainer for the ball, the aperture 32 being circular and smaller than the ball circumference but larger than the section through the ball in the plane of the wall 31, so that the ball is held in the housing for engagement with the lower race plate 28 but is free to roll on the track 16. The plate 28 is held against accidental separation from the bearing during assembly by opposed pins 33 projecting with a tight driving fit through suitable apertures in opposite walls of the housing 26, slightly below the top of the roller ball 30. The housing is secured in engagement with the offset bottom portion of the door 18 by an angle bracket 34 welded or otherwise fastened to the door and housing and against which the upper race plate 27 bears when it projects beyond the overlying offset portion of the door.

When the door is shifted in either direction to open or close the opening, the roller assemblies 25 of course move therewith, the balls 30 rolling on the track 16 in a plane parallel to the plane of movement of the door 18, so that the plane in which the balls roll is normal to the transverse planes in which are located their points of engagement with the respective plates 28. As the balls 30 roll in this vertical longitudinal plane, they drive the lower race plates 28 for rotation in their horizontal planes about their axes, such rotation of the plates in either direction being easily effected because they turn on the bearing balls 29. The relative movement of the door and one of the plates 28 is indicated by the respective arrows in Fig. 4. The bearing balls 29 revolve with the plate 28 about the rotational axis, rolling in the races of the plates 27 and 28, as will be evident from this figure. It should be noted that by reason of the location of the points of engagement of the roller balls 30 with their associated plates 28 at the intersections of the plane of rolling of the balls and particular planes through the axes of the plates, there is no tendency for the balls to move laterally out of the plane of movement of the door during longitudinal shifting thereof. The provision of the rotatable plate 28 and the location of the roller ball 30 relative thereto greatly minimizes any sliding friction between the ball and the door 18 or track 16, so that the door rolls easily and smoothly in either direction on the track. The roller assembly disclosed thus permits movement of the door in the easiest possible manner, with only rolling friction to be coped with.

When the door 18 is moved to closed position, the front and rear edges engage with the spark strips and the door is urged laterally into close engagement with the door casing and threshold plate 13 by camming action of angled surfaces, as is well known in the railway car art, and similarly the door is moved laterally away from the car side when opened. Such lateral movement of the door, which of course is relatively slight, is not in the plane of its longitudinal movement, and the balls 30 therefore do not roll in a plane normal to the transverse planes of location of the engagement points with the plates 28, but instead move relative to the plates in a more or less radial direction. As hereinbefore pointed out, the apertures 32 are larger than the portions of the balls 30 projecting therethrough, so that the balls may roll on the plates 28 to a limited extent in a radial plane at an angle to the longitudinal plane of movement previously referred to, and the size of the apertures is such as to permit such rolling of the balls for a distance conforming to the lateral door movement. Thus there is only rolling friction, and no sliding friction, in lateral movements of the door 18.

In the illustrative embodiment described, referring to Fig. 5 and assuming that the distance between the full line and broken line positions of the roller assembly 25 there shown represents two revolutions of the roller ball 30 along the track 16, the plate 28 will rotate two and a half times as the door travels this distance, and the bearing balls 29 will similarly revolve about the plate axis one and a quarter times. This travel of the plate about the rotational axis of the plate is indicated by the spiral arrowed line at the broken line position. Obviously, the relative proportions of the parts described may be varied from those of the illustrative example if desired, resulting in corresponding changes in the relative operation of the parts.

The invention provides a very economical construction which reduces to negligibility sliding friction between the door and track in opening and closing box car doors and the like. Although it is not limited to such use, it is particularly advantageous in such applications because it may be applied to such doors prior to their being hung in place, and requires no adjustment or assembly operation after the door has been placed in position or approximately in position. In addition, two of the roller assemblies 25, placed as described, maintain the door in properly squared relation on the track 16 and prevent any tilting thereof in its plane and assure proper association of the door with the door opening at all times. The construction disclosed is economical, readily assembled and easily applied, thus reducing labor costs, and also is light in weight yet sturdy and trouble-free.

What is claimed is:

1. A supporting roller for a slidable door or the like comprising a housing, an anti-friction bearing in the housing including a plate member rotatable about a substantially vertical axis and having a lower surface including a flat portion, a ball disposed for engagement with the flat portion of the lower surface of the plate at a point eccentric of said axis and in a plane radial thereto having a portion projecting below the housing, and a retainer holding the ball in the housing for said engagement having an aperture to accommodate said projecting ball portion, said aperture being of an extent greater than the section of the ball in the plane of the retainer for rolling of the ball in a plane normal to said radial plane and passing through said point and for limited rolling of the ball on the plate out of said normal plane.

2. A supporting roller for a slidable door or the like comprising a housing, an anti-friction bearing in the housing including a plate member rotatable about a substantially vertical axis and having a lower surface including a flat portion, a ball disposed for engagement with the flat portion of the lower surface of the plate at a point eccentric of said axis and in a plane radial thereto having a portion projecting below the housing, and a retainer holding the ball in the housing for said engagement having an aperture to accommodate said projecting ball portion, said aperture being of an extent greater than the section of the ball in the plane of the retainer but less than the circumference of the ball for retaining the ball and for rolling of the ball in a plane normal to said radial plane and passing through said point and for limited rolling of the ball on the plate out of said normal plane.

References Cited in the file of this patent

UNITED STATES PATENTS

| 1,835,125 | Vegren et al. | Dec. 8, 1931 |

FOREIGN PATENTS

| 71,135 | Germany | Sept 23, 1893 |
| 111,156 | Germany | June 12, 1900 |
| 739,913 | France | Jan. 19, 1933 |